(12) United States Patent
Cueto

(10) Patent No.: US 10,161,550 B2
(45) Date of Patent: Dec. 25, 2018

(54) APPARATUS FOR CONNECTING A FUEL INJECTOR TO A TEST MACHINE

(71) Applicant: Omar Cueto, Jacksonville, FL (US)

(72) Inventor: Omar Cueto, Jacksonville, FL (US)

(*) Notice: Subject to any disclaimer, the term of this patent is extended or adjusted under 35 U.S.C. 154(b) by 173 days.

(21) Appl. No.: 14/752,915

(22) Filed: Jun. 27, 2015

(65) Prior Publication Data

US 2015/0300546 A1 Oct. 22, 2015

Related U.S. Application Data

(63) Continuation of application No. 13/566,754, filed on Aug. 3, 2012, now Pat. No. 9,097,226.

(60) Provisional application No. 61/514,859, filed on Aug. 3, 2011.

(51) Int. Cl.
*G01M 15/02* (2006.01)
*F16L 37/00* (2006.01)
*F02M 55/00* (2006.01)
*F02M 65/00* (2006.01)
*F16L 21/00* (2006.01)
*F16L 37/08* (2006.01)
*F16L 41/00* (2006.01)

(52) U.S. Cl.
CPC ............ *F16L 37/00* (2013.01); *F02M 55/004* (2013.01); *F02M 65/00* (2013.01); *F02M 65/001* (2013.01); *F16L 21/00* (2013.01); *F16L 37/08* (2013.01); *F16L 41/00* (2013.01); *Y10T 29/53* (2015.01)

(58) Field of Classification Search
USPC .............. 73/114.38, 114.45, 114.46, 114.47, 73/114.48, 114.49, 114.51, 116.04
See application file for complete search history.

(56) References Cited

U.S. PATENT DOCUMENTS 4,185,494 A * 1/1980 Yelke ..................... F02M 65/00
73/114.28
4,712,421 A * 12/1987 Young .................... F02M 65/00
73/114.45
4,788,858 A * 12/1988 Liebermann ......... F02M 65/001
73/114.48

(Continued)

*Primary Examiner* — Eric S McCall
(74) *Attorney, Agent, or Firm* — Stephen E. Kelly; Hill Ward Henderson, P.A.

(57) ABSTRACT

Disclosed is a surge chamber configured for releasably connecting a fuel injector to a fuel injection testing machine in an adjustable manner to accommodate the various fuel injector orientations produced by different manufacturers. The apparatus generally comprises a surge chamber, a quick connect assembly, and a coupler adapted to connect to the fuel injector being tested. The quick connect attaches to the surge chamber, and the coupler is configured to securely and removably connect the fuel injector to the quick connect via the fuel injector inlet. The test fluid passes from the surge chamber, through the quick connect and coupler, and into the injector, where it is typically injected into a spray chamber. In another embodiment, the chamber comprises a swivel cap that permits rotation of the chamber about its longitudinal axis. Such rotation may be desirable where the fuel injection inlet does not connect to the fuel injector at a 90-degree angle, or where the configuration of the fuel injection testing machine requires the injector to be oriented at a certain angle to properly engage the spray chamber.

16 Claims, 9 Drawing Sheets

(56) References Cited

U.S. PATENT DOCUMENTS

| | | | | |
|---|---|---|---|---|
| 4,845,979 | A * | 7/1989 | Farenden | F02M 65/008 73/114.45 |
| 5,000,043 | A * | 3/1991 | Bunch, Jr. | F02M 65/00 73/114.46 |
| 5,187,974 | A * | 2/1993 | Mellits | G01L 19/0007 73/40 |
| 5,633,457 | A * | 5/1997 | Kilar | F02B 77/04 73/114.45 |
| 6,234,002 | B1 * | 5/2001 | Sisney | F02M 65/001 134/166 R |
| 7,370,520 | B2 * | 5/2008 | Kortsen | F02M 65/003 73/114.51 |
| 7,878,050 | B2 * | 2/2011 | Cueto | F02M 65/003 73/114.48 |
| 7,975,535 | B2 * | 7/2011 | Cueto | F02M 65/001 73/114.48 |
| 8,939,019 | B2 * | 1/2015 | Kordass | F02M 65/00 73/114.45 |
| 2003/0150259 | A1 * | 8/2003 | Unger | F02M 65/001 73/114.51 |
| 2005/0034514 | A1 * | 2/2005 | Shen | G01M 15/00 73/114.53 |
| 2007/0157716 | A1 * | 7/2007 | Kortsen | F02M 65/003 73/114.45 |
| 2009/0277258 | A1 * | 11/2009 | Cueto | F02M 65/001 73/114.48 |
| 2009/0279087 | A1 * | 11/2009 | Cueto | F02M 65/003 356/338 |
| 2011/0226213 | A1 * | 9/2011 | Horriat | F02M 65/007 123/198 A |
| 2012/0073361 | A1 * | 3/2012 | Cueto | F02M 65/001 73/114.45 |
| 2013/0220275 | A1 * | 8/2013 | Stein | F02M 53/00 123/447 |

* cited by examiner

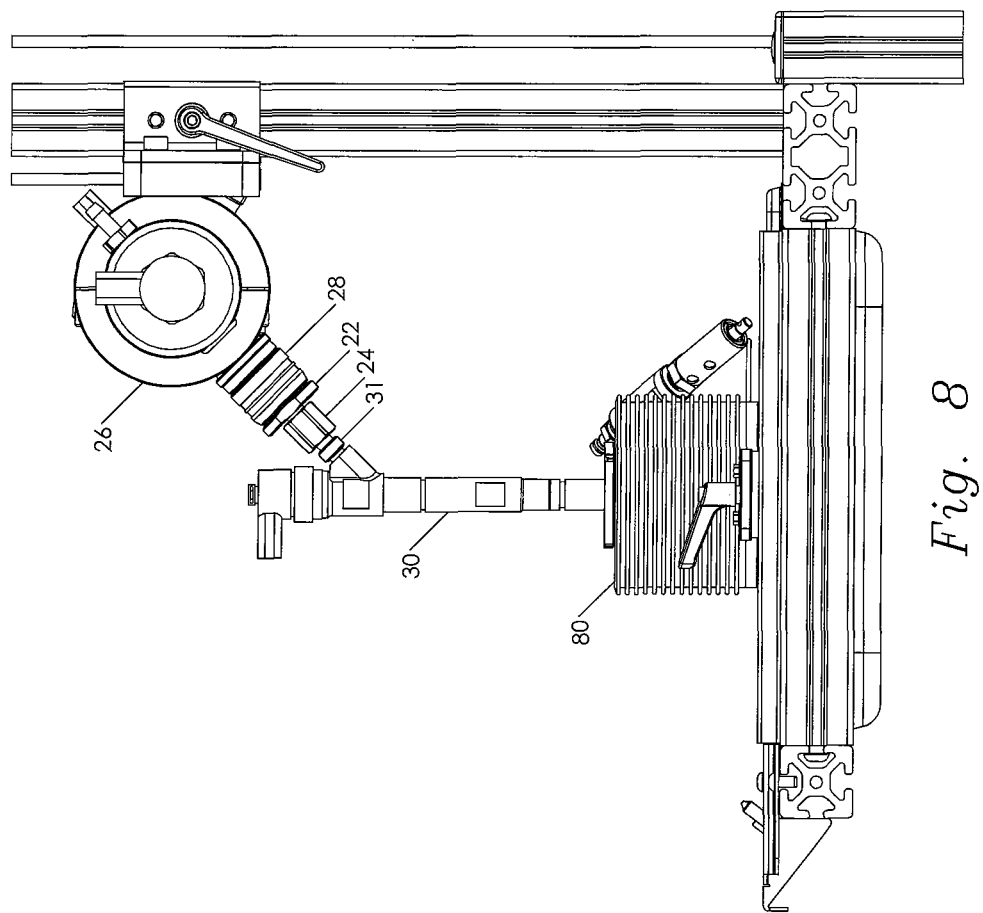

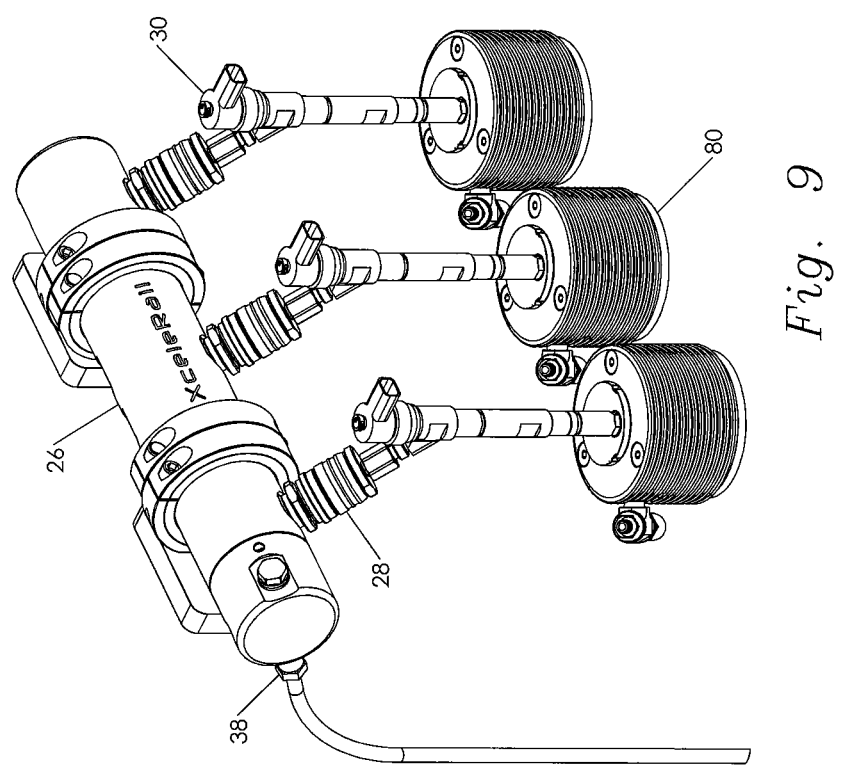

APPARATUS FOR CONNECTING A FUEL INJECTOR TO A TEST MACHINE

CROSS REFERENCE TO RELATED APPLICATIONS

Pursuant to 35 U.S.C. § 120, this application is a continuation of U.S. patent application Ser. No. 13/566,754, filed on Aug. 3, 2012, which claimed the benefit of U.S. Provisional Patent Application No. 61/514,859, filed on Aug. 3, 2011, the entire contents of each of which are incorporated herein by this reference.

TECHNICAL FIELD

The present invention relates to an apparatus for releasably connecting a fuel injector to a test stand apparatus. In greater detail, the present invention relates to an apparatus for delivering fuel to one of many types and makes of fuel injectors on a test stand wherein the injector is releasably mounted to the testing machine in a manner permitting laminar flow of test fluid in multiple test injections.

BACKGROUND

Modern common rail injection systems generate multiple pulses, or "shots," of fuel in each injection event. An ordinary practitioner will understand the general principles of how pre-burn and post-burn shots of fuel correlate to clean running engines, fuel economy, and reduced emissions. To optimize the performance of fuel injectors for multi-pulse injections, practitioners rely on testing fuel injectors using stand-alone testing machines which simulate fuel injector performance inside an operating engine. One type of fuel injection testing machine relies on cavitation to determine the time duration of a pulse of test fluid emitted from a fuel injector. The test fluid can be any type of fuel or other liquid capable of simulating fuel flowing through a fuel injector in an operating engine.

The development of multi-pulse common rail injection systems in which fuel injectors are actuated to provide pilot and/or post injections as well as the primary or main injection has prompted the need for new, end-of-the-line, functional test equipment that can measure the performance of the fuel injector.

It is known to connect a positive displacement system to a highly accurate electronic displacement measuring system, and these systems are sufficiently accurate to measure and test multi-pulse common rail injection systems. However, these systems are typically very complex and expensive. Consequently, such positive displacement, piston type measurement systems are not suitable for use in the manufacturing assembly line environment where numerous systems are required to test a significant number of fuel injectors.

An example of an alternative method to positive displacement includes a common-rail fuel injection rate measurement system consisting of a pressure chamber with pressure sensors, an amplifier box, an output processing unit, a data processing unit, and a volumetric flow-meter. These systems often include a back pressure sensor, a temperature sensor, a back pressure relief valve, and a discharge valve.

However, such known systems require complex processing and filtering of captured sensor output to derive information regarding the fuel injection quantity, variation, and/or rate shape. Such filtering and complex processing is necessary to remove the noise in the acquired data caused by the fuel pressure pulses reflected and propagating within the system.

Unfortunately, developing such extensive filters and processing methods is expensive. Furthermore, filtering and processing sensor output can decrease the accuracy of the system since the quality of the filters and methods used to process the sensor data can render the results inaccurate. Often, the resolution of the apparatus is not able to resolve the microsecond difference between the twin rate peaks of a multi-pulse common rail injection system.

More effective fuel injection testing machines are taught in U.S. Pat. No. 7,878,050 to Cueto and U.S. Pat. No. 7,975,535 to Cueto. The entire contents of each of these two patents are incorporated herein by this reference. Even though these machines greatly increase the efficiency of fuel injection testing, a common testing problem is that different manufacturers make fuel injectors with different dimensions, orientations, sizes, and shapes. Thus, testing injectors manufactured by different sources often requires the time-consuming and awkward task of adjusting the orientation of the fuel injection testing machine before running a test on certain injectors.

Therefore, what is needed is a surge chamber operably attached to a fuel injection testing machine and configured for quickly connecting to a fuel injector while accommodating the various sizes, shapes, and orientations of injectors made by different manufacturers.

SUMMARY OF THE INVENTION

The present apparatus comprises a surge chamber configured for releasably connecting a fuel injector to a fuel injection testing machine in an adjustable manner to accommodate the various fuel injector orientations produced by different manufacturers. The surge chamber apparatus is configured to deliver test fluid to the fuel injector being tested, and the apparatus provides a laminar flow of injected test fluid for testing multiple injections.

The apparatus generally comprises a surge chamber, a quick connect assembly, and a coupler adapted to connect to the fuel injector being tested. The quick connect attaches to the surge chamber, and the coupler is configured to securely and removably connect the fuel injector to the quick connect via the fuel injector inlet. The test fluid passes from the surge chamber, through the quick connect and coupler, and into the injector, where it is typically injected into a spray chamber.

In one embodiment, the chamber comprises a swivel cap that permits rotation of the chamber about its longitudinal axis. Such rotation may be desirable where the fuel injection inlet does not connect to the fuel injector at a 90-degree angle, or where the configuration of the fuel injection testing machine requires the injector to be oriented at a certain angle to properly engage the spray chamber. The swivel cap is attached to the chamber by locking bearings retained in an annular groove by a locking pin. The bearings permit a tight seal between the swivel cap and the chamber while permitting rotational movement between these two components.

Once the fuel injector is mounted to the chamber via the quick connect, the chamber can then be rotated to orient the fuel injector to the proper alignment with the spray chamber. Thus, the swivel cap greatly increases the economy of fuel injection testing between various fuel injectors manufactured by different sources because the testing personnel does not have to reconfigure the testing machine between batches of injectors made by different suppliers or manufacturers.

BRIEF DESCRIPTION OF THE DRAWINGS

FIG. 8 illustrates a typical fuel injector on an injection testing machine where the fuel injector is operably connected to the surge chamber and inserted into the spray chamber.

FIG. 9 illustrates an embodiment of the surge chamber having a plurality of injectors simultaneously attached for testing.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, or proportions shown in the figures.

DETAILED DESCRIPTION

With reference to the drawings, the invention will now be described with regard for the best mode and the preferred embodiment. In general, the device is a surge chamber apparatus configured for removably connecting to a fuel injector and to a fuel injection testing machine, wherein the apparatus is configured to deliver laminar flow of the test fluid to the fuel injector. The embodiments disclosed herein are meant for illustration and not limitation of the invention. An ordinary practitioner will understand that it is possible to create many variations of the following embodiments without undue experimentation.

Generally, fuel injection testing machines have a pump and a motor that force pressure waves of testing fluid into the fuel injector being tested. To alleviate large pressure waves from reaching the injector, the testing machine generally comprises a surge chamber upstream from the fuel injector. The surge chamber is configured to provide laminar flow to the fuel injector, which optimizes testing conditions for proper analysis of the injector's performance. The injectors are best tested under conditions that simulate performance in an actual operating engine. Thus, the machine simulates the volume of testing fluid, as well as temperature and pressure as occur under actual operating conditions inside a working engine.

Figure 1:
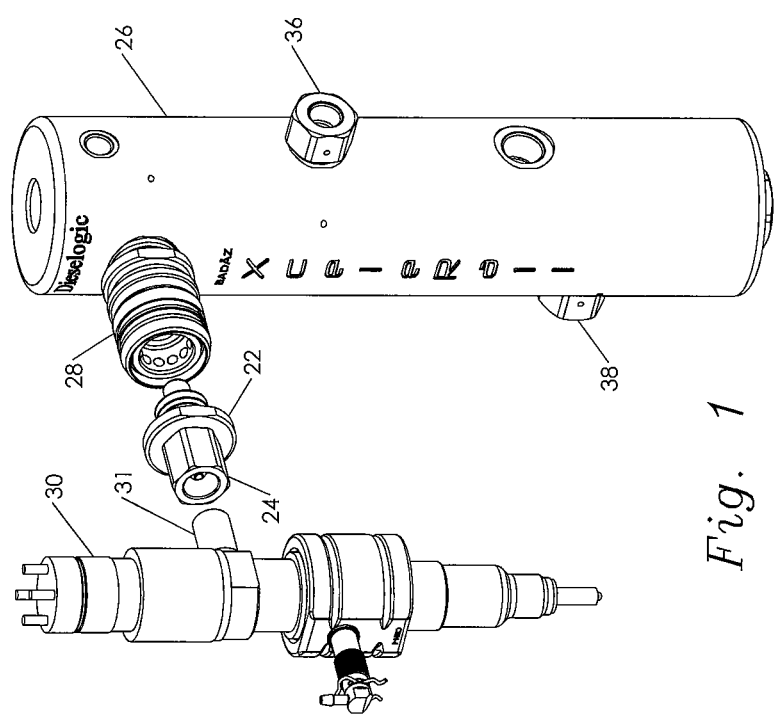
FIG. 1 shows and exploded view of a typical surge chamber connection to a fuel injector.

Referring to FIG. 1, the apparatus generally comprises a surge chamber 26 (or "accumulator"), a quick connect assembly 28, and a coupler 22 adapted to connect to the fuel injector 30 being tested. As described in more detail below, the quick connect 28 attaches to the surge chamber 26, and the coupler 22 is configured to securely and removably connect the fuel injector 30 to the quick connect 28 via the fuel injector inlet 31. Thus, the test fluid passes from the surge chamber 26, through the quick connect 28 and coupler 22, and into the injector 30, where it is typically injected into a spray chamber 80 (shown in FIG. 8), depending on the configuration of the particular fuel injection testing machine.

Figure 2:
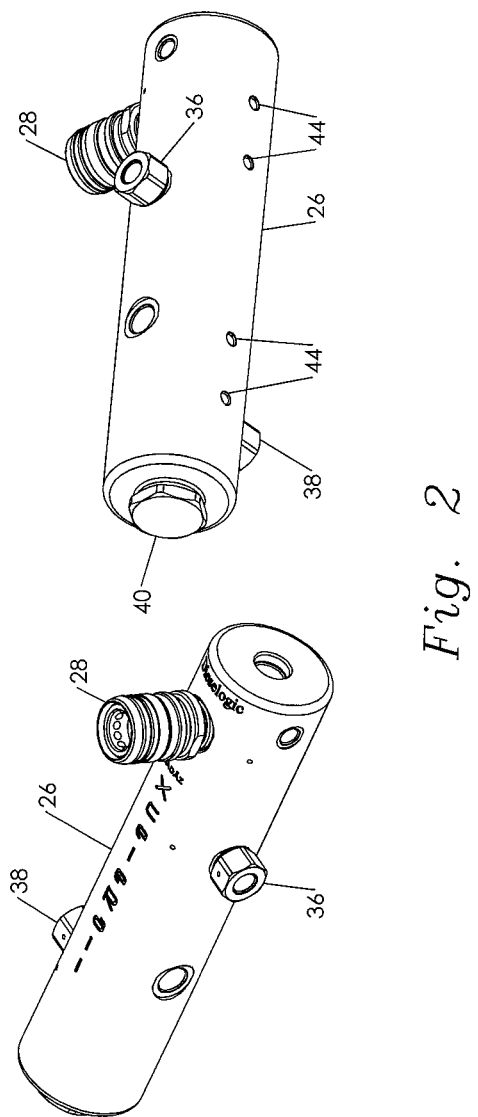
FIG. 2 depicts alternate views of a typical surge chamber.
Figure 3:
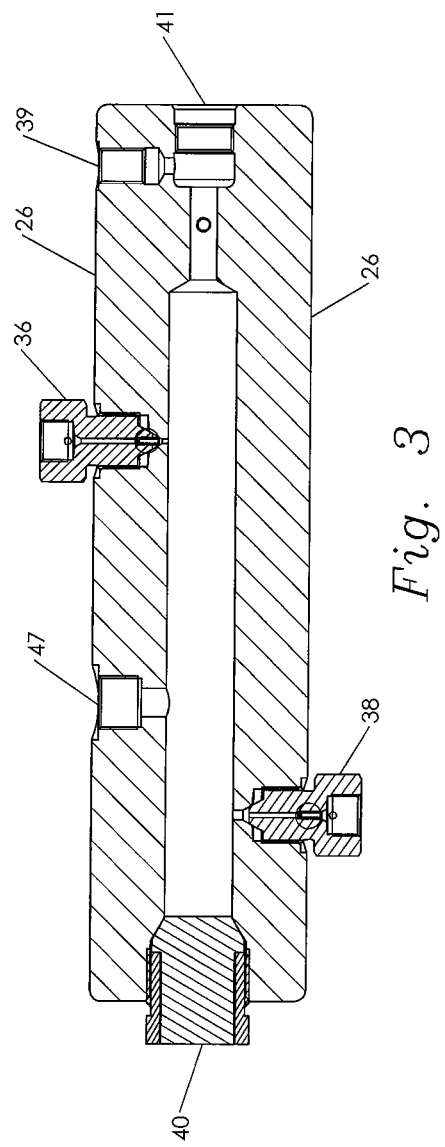
FIG. 3 shows a cross section of the surge chamber and its various ports.

Referring to FIGS. 2 and 3, the chamber 26 further comprises various ports, such as an outlet port 36 and inlet port 38. The chamber 26 can also comprise mounting holes 44 configured to connect the chamber 26 to the frame of the testing machine. Additional accessory ports in the chamber 26 can be closed with a plug 40 when not in use. In other embodiments, the chamber 26 can comprise one or more solenoids 41 or auxiliary pressure sensors 47, as needed. For example, a solenoid 41 can be placed upstream from the chamber 26 to bleed off, or filter, pressure waves from reaching the chamber 26. These pressure waves are created by the pump of the fuel injection testing machine when the pump creates the pressure needed to simulate a fuel injection event. Similarly, the outlet port 36 comprises a solenoid valve 41 configured to relieve excess pressure from reaching the fuel injector 30. The solenoid 41 can also be used to control the temperature of the test fluid by relieving pressure or allowing pressure to build, as desired for the particular test being performed by the apparatus. In one embodiment, the solenoid 41 comprises a bleed port 39 to further bleed off undesired pressure.

Figure 4:
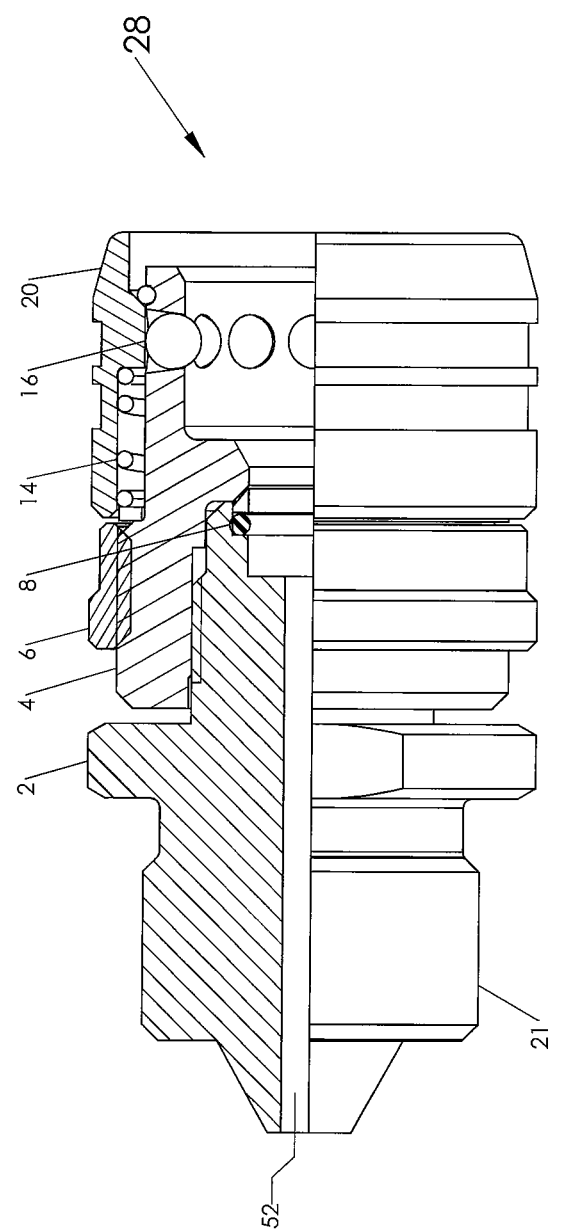
FIG. 4 is a partial cutaway view of the quick connect assembly.

Referring to FIG. 4, the quick connect assembly 28 comprises an adaptive connector 2 having a body 4, a locking ring 6, a spring 14, locking balls 16, and a sleeve 20, and an autoclave fitting 21. The adaptive connector 2 is threaded into the body portion 4. Optionally, an "O" ring 8 is used to form a seal between the connector 2 and the body 4. The body 4 of the quick connect 28 further comprises a spring 14 that biases a sleeve 20 toward a "closed" position. In this position, the sleeve 20 covers the locking balls 16, forcing the locking balls 16 into an annular configuration of a smaller, "closed" diameter. To open the locking balls 16, the sleeve 20 is pushed toward the connector 2, which compresses the spring 14 and allows the sleeve 14 recede past the locking balls 16, thus allowing the locking balls 16 to expand to an annular configuration of a larger, "open" diameter. In the closed position, the locking balls 16 lock the coupler 22 in place when the coupler 22 engages the quick connect 28, as described below. The locking ring 6 is in a threaded engagement with the body 4 so that when the sleeve 20 is closed, the locking ring 6 can be tightened to abut the sleeve 20, thereby locking it in the closed position. To release the sleeve 20, the locking ring 6 must first be loosened from contact with the sleeve 20.

Figure 5:
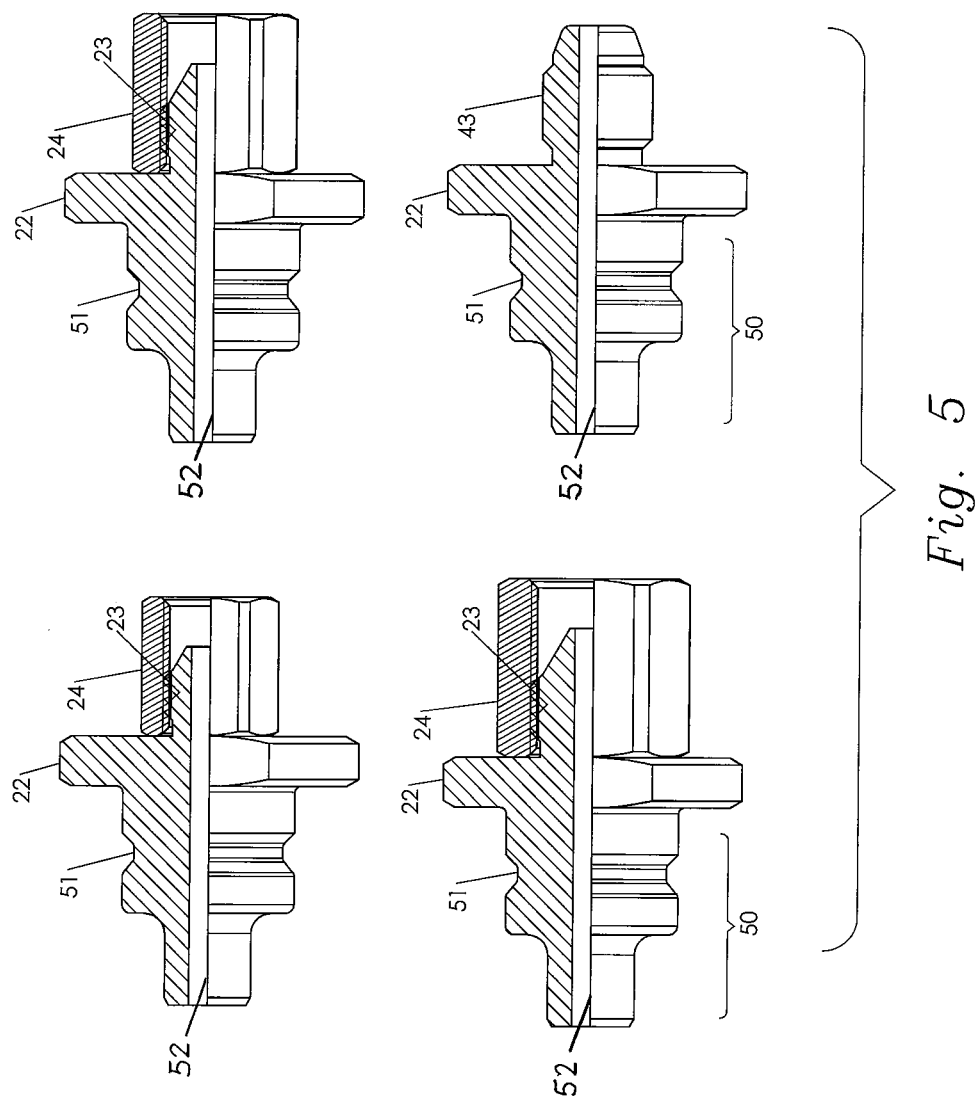
FIG. 5 shows partial cutaway views of alternate embodiments of the coupler.

FIG. 5 depicts the various embodiments of the coupler 22, which connects the injector 30 to the quick connect assembly 28. The coupler 22 generally comprises two ends, one end comprising a nipple 50 having an annular groove 51, and the opposite end having a fuel injector engagement assembly 43. For example, the fuel injector engagement assembly could be a threaded extension 23 configured to engage a nut 24, which, in turn, engages the injector 30 via the injector inlet 31.

In use, the quick connect 28 is attached to the surge chamber 26 via a port in the chamber 26. The sleeve 20 is biased closed by the spring 14. To attach the coupler 22, the user forces the sleeve 20 toward the into the "open" position, which releases the locking balls 16 as described above. The nipple 50 is then inserted into the quick connect 28, and the sleeve 14 is released from the open position. As the sleeve 20 closes, the locking balls 16 are forced into a seated engagement with the groove 51 on the coupler 22. The locking ring 6 is then tightened, and the connector 2 is in a locked engagement with the coupler 22 via the locking balls 16 seated in the groove 51. The coupler 22 is released from the connector 2 when the locking ring 6 is loosened and released from the sleeve 20, the sleeve 20 is forced back to release the locking balls 16 from seated contact with the groove 51.

The chamber 26 is configured to retain a pressurized fluid at a pressure of about 2000 bar, and the chamber 26 is sized to act as a surge chamber, or accumulator, providing a reserve volume of test fluid for rapid multiple-pulse injection testing. In embodiments where the apparatus includes multiple internal pressure sensors 41, 47 in line with a supply path to the fuel injector 30, pressure sensors 41, 47 can monitor the injection pressure drops to permit analysis of the rate shapes of each injection event.

Under optimum conditions for testing the fuel injector 30, the fuel injection testing machine should create laminar flow of the testing fluid. The performance of the fuel injector 30 is best analyzed under the conditions of laminar flow because under these conditions, the problems and disconformities of the fuel injector 30 are most readily apparent. Simulation of fuel injection performance under the actual conditions of engine operation requires a test volume of about 100 mL of testing fluid. To create laminar flow in the testing machine for this amount of test fluid, the fuel injector 30 is connected to the chamber 26 at a distance of between about 50 mm to about 150 mm, and the fuel injector 30 is fluidly connected to the chamber 26 via a straight through bore 52 (shown in FIG. 4) port having an inner diameter of about 3.5 mm to about 6 mm.

In one embodiment, the solenoids 41 can be arranged into a safety pressure relief mechanism comprising a dual stage fuel rail pressure limiting mechanism. The first stage relieves fuel rail pressure upstream from the chamber 26 if the pressure exceeds about 1,950 bar, and the second stage relieves pressure at the solenoid 41 to maintain pressure at about 900 bar.

In another embodiment, the chamber 26 comprises a plurality of outlet ports 36, each of which receives a quick connect assembly 28 attached to a coupler 22, which is configured and adapted for attachment to a fuel injector 30, as described above. This embodiment promotes and accommodates simultaneous attachment and testing of a plurality of fuel injectors 30 (shown in FIG. 9).

A common problem in fuel injection testing is that different manufacturers make fuel injectors with different dimensions, orientations, sizes, and shapes. Thus, the testing of injectors 30 manufactured by different sources often requires the time-consuming and awkward task of reconfiguring the orientation of the fuel injection testing machine before running a test on certain injectors 30. To alleviate this problem and increase efficiency in fuel injection testing, one embodiment of the chamber 26 comprises a swivel cap 70 connected the main cylinder 75 of the chamber 26, wherein the swivel cap 70 permits adjustment of the orientation of the fuel injector 30 being tested. More specifically, the chamber 26 is cylindrical in shape, having a longitudinal axis 40 (shown in FIG. 6). The swivel cap 70 permits rotation of the main cylinder 75 about its longitudinal axis 45 while the swivel cap 70 remains fixed in relation to the testing machine. Such rotation may be desirable where the fuel injection inlet 31 does not connect to the fuel injector 30 at a 90-degree angle (see FIG. 8), or where the configuration of the fuel injection testing machine requires the injector 30 to be oriented at a certain angle to properly engage the spray chamber 80.

Figure 6:
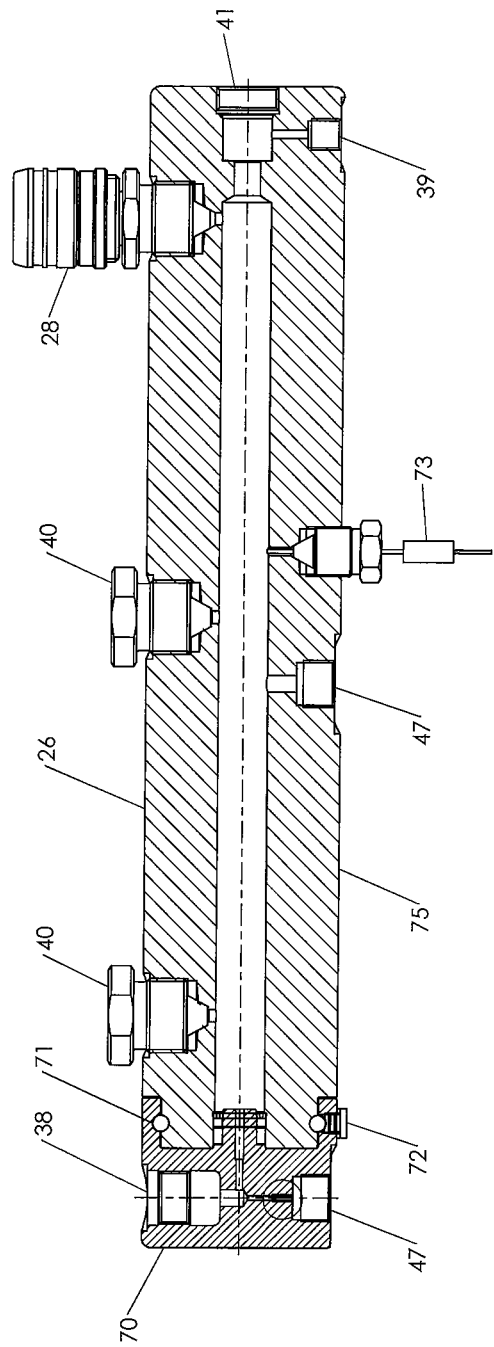
FIG. 6 shows a cross section of an embodiment in which the surge chamber comprises a swivel cap.
Figure 7:
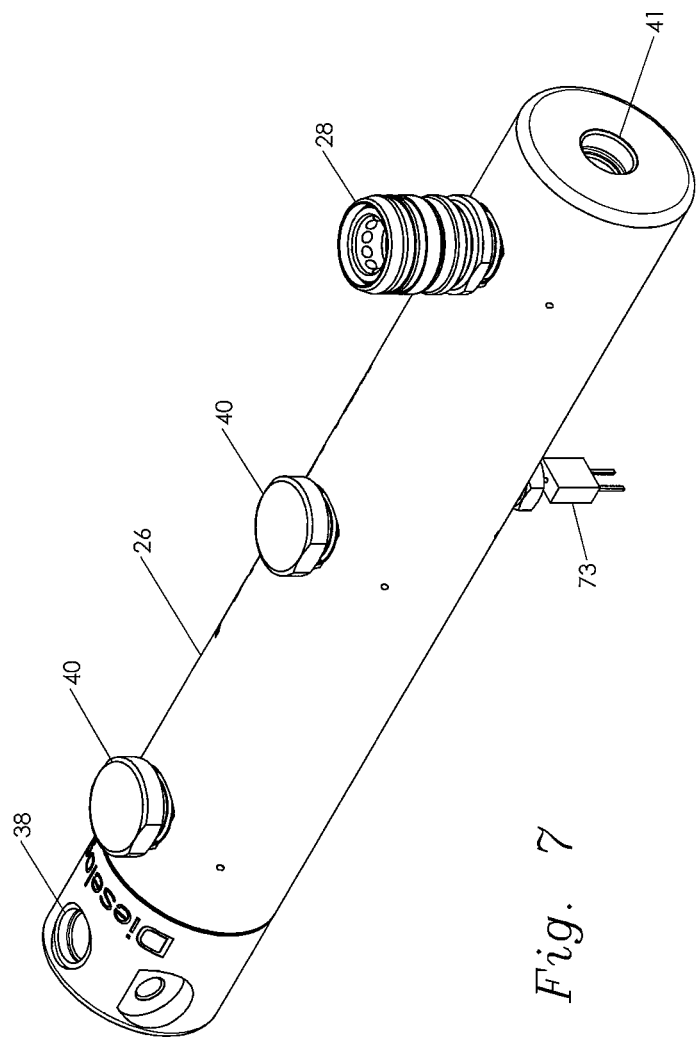
FIG. 7 shows an isometric view of an embodiment in which the surge chamber comprises a swivel cap.

In embodiments having a swivel cap 70, such as those shown in FIGS. 6-8, the surge chamber 26 is mounted to the fuel injection testing machine via the swivel cap 70 such that the swivel cap remains fixed while the main cylinder 75 is rotated about the longitudinal axis 45. The swivel cap 70 comprises an inlet port 38, and the main cylinder 75 of the chamber 26 comprises one or more outlet ports 36 mating with either a quick connect 28 or a plug 40. Since the inlet port 38 is located on the swivel cap 70 and the outlet port 36 is located on the main cylinder 75 of the chamber 26, the outlet port 36 can be rotated about the longitudinal axis 45 relative to the inlet port 38. This rotation of the main cylinder 75 permits attachment of fuel injectors 30 wherein the injector inlet 31 attached to the injector 30 at an angle, as shown in FIG. 8. The chamber 26 can also comprise a solenoid 41, which, in most embodiments, will have a bleed port 39 configured to bleed off excess pressure near the solenoid 41. The chamber 26 can comprise a variety of optional pressure sensors 47, as previously discussed.

In one embodiment, the swivel cap 70 is attached to the main cylinder 75 by a bearing and groove connection. As one non-limiting example, the main cylinder 75 comprises an annular groove and the swivel cap 70 comprises locking bearings 71 retained in the annular groove by a locking pin 72. Alternately, the groove could be located inside the swivel cap 70 and the bearings either comprised within the mail cylinder 75 or engaged as a separate element apart from either the swivel cap 70 or main cylinder 75. The bearings 71 permit a tight seal between the swivel cap 70 and the main cylinder 75 while permitting rotational movement between these two components. In one embodiment, the main cylinder 75 comprises a thermo couple 73 configured to monitor the temperature of the fluid inside the main cylinder 75, which further promotes analysis of the fuel injector 30 performance.

Once the fuel injector 30 is mounted to the chamber 26 via the quick connect 28, the main cylinder 75 can then be rotated to orient the fuel injector 30 to the proper alignment with the spray chamber 80. Thus, the swivel cap 70 greatly increases the time economy of fuel injection testing between various fuel injectors manufactured by different sources because the testing personnel do not have to reconfigure the testing machine between batches of injectors 30 originating from different suppliers or manufacturers.

In another embodiment, the main cylinder 75 comprises a plurality of outlet ports 36, each of which receives a quick connect assembly 28 attached to a coupler 22, which is configured and adapted for attachment to a fuel injector 30, as described above. This embodiment promotes and accommodates simultaneous attachment and testing of a plurality of fuel injectors 30 (shown in FIG. 9).

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. An apparatus for connecting a common rail fuel injector to a test stand to test the multi-pulse injection performance of the fuel injector, the apparatus comprising:

a surge chamber having a longitudinal axis, a swivel cap comprising an inlet port, and a main cylinder comprising an outlet port, said main cylinder adapted for rotation about the longitudinal axis in relation to the swivel cap, thereby accommodating rotation of the outlet port in relation to the inlet port;

a quick connect assembly connected to the outlet port, the quick connect assembly configured to receive a test volume of fluid through an inlet; and a coupler having two ends, one end comprising a nipple configured for insertion into the quick connect assembly, and the opposite end comprising a fuel injector engagement assembly;

wherein the quick connect assembly and coupler mate together to form a straight through bore configured to create laminar flow of the test volume of fluid for resolving the microsecond difference between injection peaks produced by multi-pulse injection of the test volume of fluid.

2. The apparatus of claim 1, wherein the straight through bore has an inner diameter of about 3.5 millimeters to about 6 millimeters.

3. The apparatus of claim 1, wherein the test volume of fluid is about 100 mL.

4. The apparatus of claim 3, wherein the straight through bore has an inner diameter of about 3.5 millimeters to about 6 millimeters.

5. The apparatus of claim 3, wherein the straight through bore has a length in the range of about 50 millimeters to about 150 millimeters.

6. The apparatus of claim 5, wherein the straight through bore has an inner diameter of about 3.5 millimeters to about 6 millimeters.

7. The apparatus of claim 1, wherein the straight through bore has a length in the range of about 50 millimeters to about 150 millimeters.

8. The apparatus of claim 7, wherein the straight through bore has an inner diameter of about 3.5 millimeters to about 6 millimeters.

9. An apparatus for connecting a common rail fuel injector to a test stand to test the multi-pulse injection performance of the fuel injector, the apparatus comprising:

a surge chamber having a longitudinal axis, a swivel cap comprising an inlet port, and a main cylinder comprising an outlet port, said main cylinder adapted for rotation about the longitudinal axis in relation to the swivel cap, thereby accommodating rotation of the outlet port in relation to the inlet port;

a quick connect assembly connected to the outlet port, the quick connect assembly configured to receive a test volume of fluid through an inlet, the quick connect assembly having an adaptive connector, a body having a sleeve, and a first straight through bore portion; and a coupler having two ends, one end comprising a nipple configured for insertion into the sleeve of the quick connect assembly, and the opposite end comprising a fuel injector engagement assembly, the coupler further comprising a second straight through bore portion;

wherein the quick connect assembly and coupler mate together such that the first straight through bore portion and the second straight through bore portion mate together as a straight through bore configured to create laminar flow of the test volume of fluid for resolving the microsecond difference between injection peaks produced by multi-pulse injection of the test volume of fluid.

10. The apparatus of claim 9, wherein the straight through bore has an inner diameter of about 3.5 millimeters to about 6 millimeters.

11. The apparatus of claim 9, wherein the test volume of fluid is about 100 mL.

12. The apparatus of claim 11, wherein the straight through bore has an inner diameter of about 3.5 millimeters to about 6 millimeters.

13. The apparatus of claim 11, wherein the straight through bore has a length in the range of about 50 millimeters to about 150 millimeters.

14. The apparatus of claim 13, wherein the straight through bore has an inner diameter of about 3.5 millimeters to about 6 millimeters.

15. The apparatus of claim 9, wherein the straight through bore has a length in the range of about 50 millimeters to about 150 millimeters.

16. The apparatus of claim 15, wherein the straight through bore has an inner diameter of about 3.5 millimeters to about 6 millimeters.

\* \* \* \* \*